United States Patent [19]

Kanazawa et al.

[11] Patent Number: 5,164,243
[45] Date of Patent: Nov. 17, 1992

[54] MAGNETIC RECORDING MEDIUM HAVING A SPECIFIED EDGE PROFILE

[75] Inventors: Minoru Kanazawa; Youichi Hayata, both of Kanagawa, Japan

[73] Assignee: Fuji Photo Film Co., Ltd., Kanagawa, Japan

[21] Appl. No.: 686,970

[22] Filed: Apr. 18, 1991

[30] Foreign Application Priority Data

Apr. 20, 1990 [JP] Japan ................................. 2-103097

[51] Int. Cl.$^5$ ................................................ G11B 5/00
[52] U.S. Cl. ................................. 428/192; 83/425.2; 83/500; 360/134; 428/336; 428/694
[58] Field of Search ............... 428/192, 336, 694; 360/134; 83/425.2, 500

[56] References Cited

U.S. PATENT DOCUMENTS

| | | | |
|---|---|---|---|
| 3,850,358 | 11/1974 | Nettles | 226/198 |
| 4,135,031 | 1/1979 | Akashi et al. | 428/323 |
| 4,307,637 | 12/1981 | Vanderhulst | 83/13 |
| 4,316,927 | 2/1982 | Kimura et al. | 428/216 |
| 4,861,674 | 8/1989 | Inaba et al. | 428/480 |

FOREIGN PATENT DOCUMENTS 64-078426  3/1989  Japan .
64-078427  3/1989  Japan .

*Primary Examiner*—Paul J. Thibodeau
*Assistant Examiner*—Stevan A. Resan
*Attorney, Agent, or Firm*—Sughrue, Mion, Zinn, Macpeak & Seas

[57] ABSTRACT

A magnetic recording medium is disclosed, comprising a nonmagnetic support having thereon a magnetic layer on one surface of the nonmagnetic support and a backing layer on the other surface thereof and having a thickness of from 10 to 40 μm, wherein the surface of an edge of the medium which is to be in contact with the inner surface of the flange of a reel of a magnetgic tape cassette, the flange being a base for aligning the edge of the medium when the medium is wound around the reel, is depressed in such a way that the cross sectional area of the depression portion (11) (FIG. 1), as defined by four lines involving an extension line (6) from the surface of the magnetic layer (4) at the edge, an extension line (7) from the surface of the backing layer (5) at the edge, a line (9) which is in tangential contact with the outermost face (8) of the cross section of the edge and which crosses the two extension lines (6) and (7) perpendicularly thereto and a peripheral line (10) of the face of the edge, is from 15 to 60 μm, that the surface roughness (Ra) of the surface of the magnetic layer is 6.5 nm or more (with a cut-off value of 0.25 mm) and that the medium, as a whole, has a Young's modulus ($M_{0.5}$) and 550 kg/mm$^2$ or less. The medium has a high quality and may be wound-up to a tape cassette or the like to have a well aligned form therein in operation for FF(fast forward)/REW(rewind) mode in a VTR.

5 Claims, 2 Drawing Sheets

MAGNETIC RECORDING MEDIUM HAVING A SPECIFIED EDGE PROFILE

FIELD OF THE INVENTION

The present invention relates to a magnetic recording medium and, in particular, to a high quality magnetic recording medium which can be wound-up to a well-aligned form at the edge when run in an FF(fast forward)/REW(rewind) mode.

BACKGROUND OF THE INVENTION

A tape-like magnetic recording medium has been conventionally prepared as follows: A ferromagnetic powder is blended with a binder, an organic solvent and other additives to form a magnetic coating composition in the form of a dispersion; then the composition is coated on a nonmagnetic support and dried thereon to form a wide-sized magnetic recording medium (web); and thereafter the web is slit into tapes each having a desired width, for example, 8 mm, ½ inch or one inch.

Figure 2:
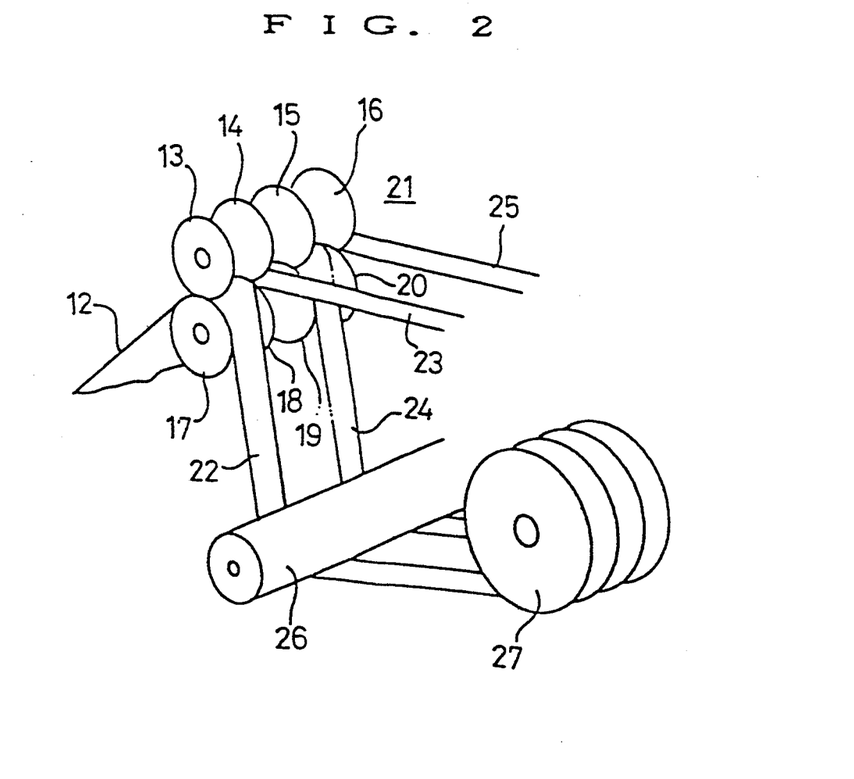
FIG. 2 is a perspective view of an apparatus for preparing a magnetic tape by slitting a magnetic tape web with a slitter means.

For purposes of slitting the web into tapes, a system such as shown in FIG. 2 is employed. Therein, a magnetic tape web (12) is slit into a plurality of tapes each having a desired width by means of slitter (21) which is composed of plural upper cutting blades (13), (14), (15) and (16) and lower cutting blades (17), (18), (19) and (20), and the thus slit magnetic tapes (22) and (24) are reeled up to a pancake (27) via a guide roller (26). Another pancake for reeling up other magnetic tapes (23) and (25), which is comparable to pancake (27), is not shown in FIG. 2.

In the practice of slitting the web into the plurality of tapes by the system above, it has been suggested that it is preferable to smooth the cross sectional profile of the edge portion of the magnetic tape as slit, or to give the edge profile a rounded configuration, in order that the tape is not as readily soiled, or the tape head is not as easily soiled when the tape is set in a cassette and run over the head in a cassette player. Moreover, almost conventional tapes, in actual practice, were slitted to have such smoothed or rounded shapes.

For instance, for purposes of smoothing the cross sectional profile of the edge of a magnetic tape, a method has been employed wherein the unslit tape or web has a Young's modulus ($M_{0.5}$) of 550 kg/mm$^2$ or more and the unslit tape or web is slit at a high slitting speed of approximately 300 m/min.

On the other hand, for purposes of making a round cross sectional profile in the edge portion of a magnetic tape, a method has proposed of using a laser beam for slitting the tape (JP-A-64-78426 and JP-A-64-78427 (the term "JP-A" as used herein refers to a "published unexamined Japanese patent application").

However, the tape, as slit by the above mentioned conventional methods, has a drawback in that the rolled-up form of the tape is not completely aligned at the tape edge when the tape is wound up by FF/REW mode. Although the tape is not soiled itself and it does not soil the head during general recording and reproduction mode, the aforementioned drawback has arisen with use of this type of tape which was given a smoothed or rounded edge.

Figure 3:
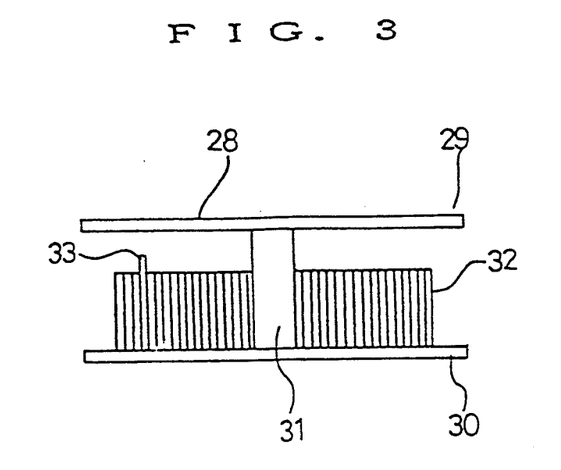
FIG. 3 is a cross sectional view of a typical reel in which a magnetic tape has been wound upon.

This problem is illustrated in FIG. 3. In particular, a magnetic tape (32) is wound up into a reel (28) in a cassette arranged horizontally. As depicted in FIG. 3, the rolled tape has a projected part (33) due to non-alignment in sequentially wound layers of the tape. This non-alignment at the tape edge undesirably affects the rolled-up form of the tape in the above mentioned FF/REW mode. The magnetic tape, which had been wound-up to have such a non-aligned rolled-up form, would cause fluctuation of the condition of the tape when run over the magnetic head. As a result, the image being reproduced from the tape would unfavorably be rendered uneven. In FIG. 3, element (29) is an upper flange, element (30) is a lower flange and element (31) is a reel shaft.

SUMMARY OF THE INVENTION

An important object of the present invention is to provide a high quality magnetic recording medium which can be wound-up to provide a well-aligned form in operation for FF/REW mode. Specifically, the medium of the present invention is not soiled nor does it soil the head for the medium in general recording and reproduction mode. Additionally, the medium may be wound-up on a reel in a well-aligned form with no projection of the edge of the rolled tape in FF/REW mode.

The above object of the present invention has been attained by providing a magnetic recording medium comprising a nonmagnetic support having thereon a magnetic layer on one surface of the nonmagnetic support and a backing layer on the other surface thereof, and having a thickness of from 10 to 40 μm, wherein the surface of an edge of the medium which is to be in contact with the inner surface of the flange of a reel of a magnetic tape cassette (the flange being a base for truing up the edge of the medium when the medium is wound around the reel) is depressed in such a way that the area, as defined by four lines comprised of 1) an extension line from the surface of the magnetic layer at the edge, 2) an extension line from the surface of the backing layer at the edge, 3) a line which is in tangential contact with the outermost face of the cross section of the edge and which crosses the both the above extension lines perpendicularly thereto and 4) a peripheral line of the face of the edge, is from 15 to 60 μm$^2$. The medium also is provided with a surface roughness (Ra) of the surface of the magnetic layer which is 6.5 nm or more (with a cut-off value of 0.25 mm) and the medium, as a whole, has a Young's modulus ($M_{0.5}$) of 550 kg/mm$^2$ or less.

As one preferred embodiment of the medium of the present invention, the cross sectional area for the depression of the surface of the edge of the medium is from 20 to 40 μm$^2$ and the ratio value obtained by dividing the depression area by the total film thickness is from 1.3 to 3.

BRIEF DESCRIPTION OF THE DRAWINGS

In the drawings, the features are described as follows: (1) is a magnetic recording medium, (2) is an edge of the medium, (3) is a nonmagnetic support, (4) is a magnetic layer, (5) is a backing layer, (6) is an extension line from the surface of a magnetic layer at the edge, (7) is an extension line from the surface of a backing layer at the edge, (8) is an outermost face of the cross section of an edge of the medium, (9) is a line which is in tangential contact with the outermost face of the cross section of an edge of the medium and which perpendicularly crosses both extension lines (6) and (7), (10) is a peripheral line along the face of an edge of the medium, (11) is an area of the depression, (21) is a slitter, (28) is a reel, (30) is a lower flange, (31) is a reel shaft, (32) is a magnetic tape, and (33) is a projected part.

DETAILED DESCRIPTION OF THE INVENTION

The present inventors have investigated the problem wherein the edge of the rolled magnetic tape is partly projected to throw-off the alignment of the rolled-up form of the tape when the magnetic tape, as previously slit by the conventional technique of using the conventional slitter means as shown in FIG. 2, is set in a tape cassette and is run in a VTR by FF/REW mode. As a result of these studies, the present inventors have discovered that the problem is attributable to an air film which is formed between the superposed wound layers of magnetic tapes or between the magnetic tape and the reel shaft when the tape is rapidly run by FF/REW mode. Thus, as a consequence, when the formed air film escapes through the gap between the superposed layers of magnetic tapes during such FF/REW mode running, whereupon the magnetic tape is pushed up to the side of the upper flange (29) as shown in FIG. 3.

In general recording and reproduction mode, a large tension is applied to the magnetic tape in order that the tape may sufficiently be brought into contact with the head. Therefore, the magnetic tape does not protrude from the ordered position when it is run under the normal mode. However, in FF/REW mode, the tension to be applied to the tape is lowered somewhat in order to elevate the running speed of the tape, and, therefore, the tape often protrudes from the ordered position when it is run under the FF/REW mode. In order to overcome the problem, the present inventors investigated the relation between the protrusion of the edge of the rolled-up tape and the shape of the edge of the tape and, as a result, have found that provision of a depression on the surface of the edge of the magnetic tape, which is to be in contact with the inner surface of the flange of a reel of a magnetic tape cassette (the flange being a base for turning up the edge of the tape when the tape is wound around the reel) is greatly related to the prevention of the protrusion of the edge of the rolled-up tape.

Figure 4:
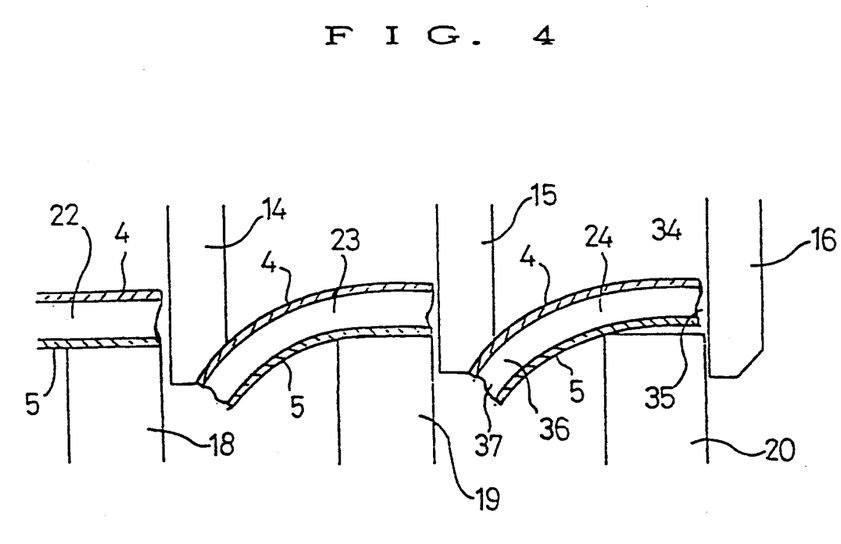
FIG. 4 is a cross sectional view of a typical slitter means slitting a magnetic tape web.

The relation between the use of a particular type of slitting means, such as depicted in FIG. 2, which is composed of the upper cutting blades and the lower cutting blades, and the shape of the edge of the magnetic tape as slit with the slitting means is discussed below. In this regard, the magnetic tape web is slit by action of the upper cutting blades (14), (15) and (16) and the lower cutting blades (18), (19) and (20) whereupon the upper layer part of the magnetic tape is cut by the tearing action while the lower layer part thereof is cut by the shearing force, as shown in FIG. 4. As a result, the face of the edge of the magnetic tape, which is the cross section of the tape as slit, is imparted a complex shape. In particular, as shown in FIG. 4, the edge (34) of the magnetic tape (24) which is in contact with the upper cutting blade (16) is provided with a depression (35) in the present invention, as shown in FIG. 4. On the other hand, the opposite edge (36) of the magnetic tape (24) is provided with a projection (37) which has a distending shape reversely corresponding to, i.e., is opposite to, the shape of the above mentioned edge (34). Where the orientation between the upper cutting blade (16) and the lower cutting blade (20) is changed, the side of the edge of the magnetic tape provided with the same depression may be correspondingly changed.

The present inventors have examined various arrangements, using various magnetic tapes each having a different shape in the surface of the edge of the tape which is to be in contact with the inner surface of the flange of a reel of a magnetic tape cassette (the flange being a base for truing up the edge of the tape when it is wound-up around the reel). As a result, the present inventors have found that the tapes given a projected edge are not effective for preventing the protrusion of the edge of the rolled-up tape but those tapes having a depressed edge are related to the prevention of the protrusion of the edge of the rolled-up tape.

Figure 1:
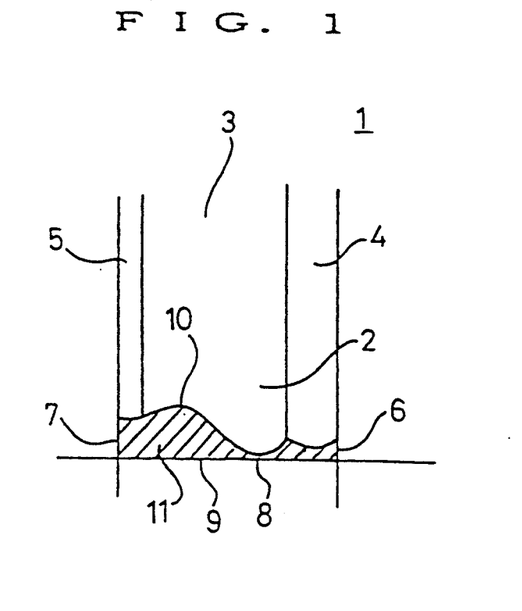
FIG. 1 is a view provided to assist in the understanding of the manner of calculating the area of the depression which is to be provided at the edge of the magnetic recording medium of the present invention.

On the basis of this understanding, the present inventors have further studied significance of the shape of the depression provided in the tape edge which is effective for prevention of the protrusion of the edge of the rolled-up tape. As a result, the present inventors have found the provision of a depression on the surface of the edge (2) of the magnetic recording medium (1) which is to be in contact with the inner surface of the flange of a reel of a magnetic tape cassette (the flange being a base for truing up the edge (2) of the medium (1) when the medium (1) is wound around the reel), as provided in such a way that the cross sectional area of the portion (11), as surrounded and defined by four lines of an extension line (6) from the surface of the magnetic layer (4), an extension line (7) from the surface of the backing layer (5), a line (9) which is in tangential contact with the outermost face (8) of the cross section of the edge and which crosses the above mentioned two extension lines (6) and (7) perpendicularly thereto and a peripheral line (10) of the face of the edge, falls within the range of from 15 to 60 $\mu m^2$ (preferably from 20 to 40 $\mu m^2$). As shown in FIG. 4, this arrangement is effective for satisfactorily preventing the protrusion of the edge of the rolled-up tape.

As noted above, the conventional thinking was that it was recommendable to smooth the cross section of the edge of a magnetic tape. Therefore, almost all conventional magnetic tapes have been slit with a slitter so as to impart a smooth edge. Under that situation, even though the tape as slit by the conventional slitter means is considered to have a nominally depressed edge, like the case shown in FIG. 4, the depression formed on the edge is relatively small and the area thereof is also relatively small.

When a magnetic tape of the present invention is used, which has an edge having the depression as defined herein and is wound-up around the reel of a tape cassette, for example, the tape is set in such a way that the edge of the tape with the defined depression is located to the inner surface of the lower flange (30), wherein said lower flange (30) serves as a base for truing-up the edge of the rolled-up tape, as shown in FIG. 3.

The area of the depression on the edge of the magnetic tape is to be selected so as to increase with enlargement of the total thickness of the tape. Additionally, it is desired that the ratio value to be obtained by dividing the area of the depression by the total thickness of the tape is to fall within the range of from 1.3 to 3, particularly from 2 to 3.

For forming the depression having a surface area to fall within the above mentioned area range on the edge of the magnetic tape of the present invention, the slitting speed of the slitter to be used for slitting the tape is lowered to preferably from 30 to 100 m/min and more preferably from 40 to 60 m/min, the gearing depth between the upper cutting blade and the lower cutting blade is defined to fall within the range of preferably from 0.2 to 0.6 mm and more preferably from 0.4 to 0.5 mm, and the ratio of the speed of the upper cutting blade to that of the lower cutting blade (upper cutting blade speed/lower cutting blade speed) is defined to be preferably from 1.03 to 1.07 and more preferably from 1.04 to 1.06. The slitting speed to be employed in the present invention is much lower than that employed in the conventional case of smoothing the cross section of the edge of the magnetic tape which is approximately 300 m/min.

Additionally, for forming the depression having the above mentioned surface area of the present invention, it is desired that the magnetic tape per se has a Young's modulus ($M_{0.5}$) (according to JIS K7127-1989) of 550 kg/mm$^2$ or less and preferably from 450 to 550 kg/mm$^2$. If the Young's modulus ($M_{0.5}$) is more than 550 kg/mm$^2$, the cross section of the edge of the tape would be too smooth so that the object of the present invention could not be attained. The Young's modulus as referred to herein means a stress applied to the magnetic tape when the tape is elongated 0.5%.

Further, in order to more sufficiently realize the acceptably rolled-up form of the magnetic tape of the present invention, the surface roughness (Ra) of the surface of the magnetic layer of the tape is 6.50 nm or more and preferably from 6.50 to 12.0 nm, in order that the air film between the magnetic tapes more easily escape therefrom while the tape is run in FF/REW mode. The surface roughness (Ra) as referred to herein means a roughness of the surface of the magnetic tape which is measured in accordance with the definition of JIS-BO 601 (page 5) and which is represented by the center line mean roughness with a cut-off value of 0.25 mm.

The area of the depression in the edge of the magnetic tape of the present invention may be obtained by the method mentioned below. The edge of the tape is cut vertically to the lengthwise direction and wrapped with an epoxy resin, and the cross section of the edge is cut out with an ultramicrotome and coated with platinum. After the thus coated section is made to be conductive, the section is photographed with FE-SEM (electric field emission type scanning electromicroscope). On the basis of the thus taken photograph, the cross sectional area of the depression is measured by the use of an image-analyzing system (IBAS-I, manufactured by (Kontron Co.).

As the ferromagnetic fine powder which may be employed in the present invention, examples include a fine ferromagnetic iron oxide powder, a fine Co-doped ferromagnetic iron oxide powder, a fine ferromagnetic chromium dioxide powder, a fine ferromagnetic metal powder, a fine ferromagnetic alloy powder, and a fine barium ferrite powder.

Moreover, as examples of a ferromagnetic alloy powder for use in the present invention, reference is made to those having a metal content of 75 wt % or more, where 80 wt % or more of the metal content is composed of at least one ferromagnetic metal or alloy (such as Fe, Co, Ni, Fe-Co, Fe-Ni, Co-Ni, Co-Fe-Ni) and less than 20 wt % of the metal content is composed of other component(s) (such as Al, Si, S, Sc, Ti, V, Cr, Mn, Cu, Zn, Y, Mo, Rh, Pd, Ag, Sn, Sb, B, Ba, Ta, W, Re, Au, Hg, Pb, P, La, Ce, Pr, Nd, Te, Bi). In these alloys, the ferromagnetic metal content may additionally contain a small amount of water, hydroxide(s) and/or oxide(s).

The method of preparing such ferromagnetic powders is conventional, and those techniques usable in the present invention may also be prepared by the conventional methods.

The ferromagnetic powder to be used in the present invention is not particularly limited with respect to the shape and the size of the grains of the powder constituents. Regarding the shape, any of acicular, ellipsoidal, granular, spherical, cubic and tabular grains may be employed. However, acicular or tabular grains are preferred from the viewpoint of the provision of excellent electromagnetic characteristics. The crystallite size and the specific surface area of the grains also are not particularly limited. However, the crystallite size is preferably 400 Å or less, and the specific surface area ($S_{BET}$) is preferably 30 m$^2$/g or more. Additionally, the ferromagnetic powder of the present invention also is not particularly limited with respect to the pH value and the surface treatment thereof. For instance, the grains of the powder may optionally be surface-treated with a substance containing an element of titanium, silicon or aluminum or may also be treated with an organic compound, for example, with a carboxylic acid, sulfonic acid, sulfate, phosphonic acid, phosphate or nitrogen-containing heterocyclic adsorbing compound such as benzotriazole. The preferred pH range for the grains is from 5 to 10. In the case of a fine ferromagnetic iron oxide powder, the ratio of Fe(II)/Fe(III) is not particularly limited.

The binder which is used in the present invention may be any of conventional thermoplastic resins, thermosetting resins, radiation hardening resins, reactive resins and mixtures thereof, which are generally used as a binder for magnetic recording media.

The above mentioned resins generally have a Tg value of from −40° C. to 150° C. and a weight average molecular weight of from 10,000 to 300,000, preferably from 10,000 to 100,000.

As usable thermoplastic resins, examples include vinyl copolymers such as vinyl chloride-vinyl acetate copolymers, copolymers composed of vinyl chloride, vinyl acetate, vinyl alcohol, maleic acid and/or acrylic acid, vinyl chloride-vinylidene chloride copolymers, vinyl chloride-acrylonitrile copolymers and ethylene-vinyl acetate copolymers; cellulose derivatives such as nitrocellulose, cellulose acetate propionate or cellulose acetate butyrate resins; acrylic resins, polyvinyl acetal resins, polyvinyl butyral resins, polyester polyurethane resins, polyether polyurethane resins, polycarbonate polyurethane resins, polyester resins, polyether resins, polyamide resins, amino resins; rubber resins such as styrene-butadiene resins or butadiene-acrylonitrile resins; silicone resins and fluorine resins.

Above all, vinyl chloride resins are preferred because of having a high dispersibility with a fine ferromagnetic powder therein.

Thermosetting resins and reactive resins usable in the present invention are those which are heated to provide an enlarged molecular weight in above mentioned ranges. These include, for example, phenol resins, phenoxy resins, epoxy resins, hardening polyurethane resins, urea resins, melamine resins, alkyd resins, silicone resins, acrylic reactive resins, epoxy-polyamide resins, nitrocellulose-melamine resins, mixtures of high molecular weight polyester resin and isocyanate prepolymer, urea-formaldehyde resins, mixtures of low molecular weight glycol/high molecular weight diol/polyisocyanate, polyamine resins, and mixtures of these substances.

Radiation-hardening resins for use in the present invention are those prepared by introducing a carbon-carbon unsaturated bond-having group as a radiation hardening functional group into the above mentioned thermoplastic resins. Preferred functional groups are acryloyl group and methacryloyl group.

Preferred binder compounds are prepared by introducing a polar group (such as epoxy group, $-NR_2$, $-NR_3X$, $-SO_3M$, $-OSO_3M$, $-PO_3M$ or $-OPO_3M_2$ where M is hydrogen, an alkali metal or an ammonium, plural M's in one group may be the same or different, R is hydrogen or an alkyl group, and X is a halogen atom) into the above mentioned binder molecules. The polar groups serve to enhance the dispersibility and durability of the magnetic substance. Using such compounds as a binder, the advantageous effect of adding an ammonium salt of a phosphate to the magnetic medium can be noticeably obtained. The content of the polar group is preferably from $1 \times 10^{-7}$ to $1 \times 10^{-3}$ equivalent, more preferably from $1 \times 10^{-6}$ to $1 \times 10^{-4}$ equivalent, per gram of polymer.

The above mentioned high polymer binders may be used singly or as a mixture of two or more thereof. These binders may be hardened by adding a conventional isocyanate-type crosslinking agent and/or a radiationhardening vinyl monomer.

As examples of usable isocyanate-type crosslinking agents, examples include polyisocyanate compounds having two or more isocyanate groups, for example, isocyanates such as tolylenediisocyanate, 4,4'-diphenylmethanediisocyanate, hexamethylenediisocyanate, xylenediisocyanate, naphthylene-1,5-diisocyanate, o-toluidinediisocyanate, isophoronediisocyanate and triphenylmethanediisocyanate; reaction products of these isocyanates and polyalcohols; and polyisocyanates to be formed by condensation of these isocyanates. Such polyisocyanates are commercially sold as trade names of Coronate L, Coronate HL, Coronate H, Coronate EH, Coronate 2014, Coronate 2030, Coronate 2031, Coronate 2036, Coronate 3015, Coronate 3040, Coronate 3041, Millionate MR, Millionate MTL, Daltosec 1350, Daltosec 2170 and Daltosec 2280 (manufactured by Nippon Polyurethane Industry Co., Ltd.); Takenate D102, Takenate D110N, Takenate D200 and Takenate D202 (manufactured by Takeda Chemical Industries Co.); Sumidule N75 (manufactured by Sumitomo Bayer Co.); Desmodule L, Desmodule IL and Desmodule HL (manufactured by Bayer of Germany); and Burnock D850 and Burnock D802 (by Dai-Nippon Ink & Chemicals, Inc.).

Radiation-hardening vinyl monomers mentioned above are compounds which are polymerized by irradiation of radiation thereto and which have one or more carbon-carbon unsaturated bonds in the molecule. Examples of the compounds are (meth)acrylates, (meth)acrylamides, allyl compounds, vinyl ethers, vinyl esters, heterocyclic vinyl compounds, N-vinyl compounds, styrene, (meth)acrylic acid, crotonic acid, itaconic acid and olefinic acids. Above all, preferred vinyl monomer compounds are those having two or more (meth)acryloyl groups, for example, (meth)acrylates of polyethylene glycols such as diethylene glycol di(meth)acrylate or triethylene glycol di(meth)acrylate; and trimethylolpropane tri(meth)acrylate, pentaerythritol tetra(meth)acrylate, dipentaerythritol penta(meth)acrylate, dipentaerythritol hexa(meth)acrylate and reaction products of polyisocyanates and hydroxy(meth)acrylates.

The content of the crosslinking agent is preferably from 5 to 45 wt % based on the total weight of the binder containing the crosslinking agent.

The proportion of the above mentioned total binder (containing crosslinking agent) in the magnetic layer of the magnetic recording medium of the present invention is from 10 to 40 wt %, preferably from 15 to 30 wt %, based on weight of ferromagnetic fine powder. If the proportion of the binder is more than the defined range, the proportion of the ferromagnetic fine powder to be filled in the magnetic layer would be too low and, as a consequence, the electromagnetic characteristic of the magnetic recording medium having the magnetic layer would be deteriorated. On the other hand, if the proportion of binder is less than the above range, the running durability of the medium would be decreased.

As the nonmagnetic support used in the medium of the present invention, polyesters such as polyethylene terephthalate or polyethylene 2,6-naphthalate; polyolefins olefins such as polyethylene or polypropylene; cellulose derivatives such as cellulose triacetate; as well as other resins such as polycarbonate, polyimide or polyamideimide can be used. If desired, the support may be metallized with a metal such as aluminum or the like. Further, the support may also be a metal foil such as an aluminum foil or a stainless steel foil.

The shape of the support may be any of tape. The thickness of the support is preferably from 5 to 35 $\mu$m and more preferably from 5 to 20 $\mu$m. The overall thickness of the medium of the present invention is from 10 to 40 $\mu$m, preferably from 10 to 30 $\mu$m and more preferably from 10 to 20 $\mu$m, as a magnetic tape.

The magnetic layer of the magnetic recording medium of the present invention preferably contains additional inorganic grains having a Mohs' hardness of 5 or more.

Inorganic grains usable in the present invention are not particularly limited, provided that they have a Mohs' hardness of 5 or more. As examples of inorganic grains having a Mohs, hardness of 5 or more, which are usable in the present invention, examples are $Al_2O_3$ (having Mohs' hardness of 9), TiO (having Mohs' hardness of 6), $TiO_2$ (having Mohs' hardness of 6.5), $SiO_2$ (having Mohs' hardness of 7), $SnO_2$ (having Mohs' hardness of 6.5), $Cr_2O_3$ (having Mohs' hardness of 9) and $\alpha$-$Fe_2O_3$ (having Mohs' hardness of 5.5). These types of inorganic grains may be used singly or as a mixture of two or more thereof.

Especially preferred are inorganic grains having a Mohs' hardness of 8 or more. If inorganic grains having a Mohs' hardness of less than 5 are used, the inorganic grains would easily be peeled off from the magnetic layer and only minimally show a desired action of polishing the head to which the magnetic tape is applied. As a result, the head would often be clogged and the running durability of the tape would be poor if inorganic grains are used having a Mohs' hardness of less than 5.

In general, the content of the inorganic grains is from 0.1 to 20 parts by weight, preferably from 1 to 10 parts by weight, per 100 parts by weight of ferromagnetic fine powders.

Additionally, it is also preferred that the magnetic layer contains a carbon black (especially one having a mean grain size of from 10 to 300 nm) or the like, in addition to the above mentioned inorganic grains. (The unit "nm" as used herein means "nanometer ($10^{-9}$ m)".)

Next, one example of a method of preparing the magnetic recording medium of the present invention will be described below.

First, a ferromagnetic powder and a binder are kneaded with a solvent along with other optional filler or additives to prepare a magnetic layer-coating composition in the form of a dispersion. The solvent to be used in the kneading step may be type which is generally used in preparing conventional magnetic coating compositions.

The kneading means is not particularly limited, and the order of adding the components to the kneading system may be determined properly according to conventional protocol.

For instance, a lubricant, various additives and a crosslinking agent are previously dissolved in an organic solvent, and the resulting solution may then be added to a magnetic dispersion separately prepared from a solvent, a binder and a magnetic powder, immediately before coating.

In preparing the magnetic coating composition, conventional additives such as dispersing agent, antistatic agent and lubricant may also be used along with the above mentioned components.

As a dispersing agent, any conventional materials may be used. Examples of a usable dispersing agent are fatty acids having from 12 to 22 carbon atoms, salts and ester compounds thereof, and derivatives thereof where a part or all of hydrogens in the compounds are substituted by fluorine(s); amides of such fatty acids; and aliphatic amines, higher alcohols, alkyl borates, sarcosinates, alkyl ether esters, trialkylpolyolefins, oxy-quaternary ammonium salts, lecithin, and low molecular epoxy compounds.

Where such a dispersing agent is used, the amount thereof is generally from 0.1 to 10 parts by weight per 100 parts of the ferromagnetic powder used.

As examples of an antistatic agent usable in the present invention, examples include electroconductive fine powders such as carbon black powder, carbon black graft polymer powder; natural surfactants such as saponin; nonionic surfactants such as alkylene oxides, glycerine derivatives, glycidol derivatives; higher alkylamines; quaternary ammonium salts, salts of pyridines and other heterocyclic compounds; cationic surfactants such as phosphonium compounds, sulfonium compounds; anionic surfactants containing an acidic group such as a carboxylic acid, phosphoric acid, sulfate or phosphate group; and amphoteric surfactants such as amino acids, aminosulfonic acids, and sulfates or phosphates of aminoalcohols.

Where the above mentioned electroconductive fine powder is used as an antistatic agent, the amount thereof is from 0.1 to 10 parts by weight per 100 parts by weight of the ferromagnetic powder to be in the magnetic layer. Where the above mentioned surfactant is used, the amount thereof is from 0.12 to 10 parts by weight of the powder.

The above mentioned dispersing agent, antistatic agent, lubricant and other additives are not strictly limited in functionality to the above categories of materials under which they were described. Instead, these compounds may have plural actions or effects. For instance, one dispersing agent may act additionally as a lubricant or antistatic agent. Therefore, it is understood that the compounds, as introduced under the above categories of compounds, are not to be construed as limited by that categorization in terms of the actions and effects that can be derived therefrom. Where substances having plural actions and effects are used, the amount thereof to be added is desirably decided in consideration of the totality of the plural actions and effects imparted by the substance.

Returning now to the discussion of the exemplary method of preparing the medium, the magnetic coating composition as prepared as mentioned above is coated on the above mentioned nonmagnetic support, whereupon plural magnetic coating compositions may be coated simultaneously or successively to form plural magnetic layers, for example, by using a wet-on-wet coating method as described in JP-A-62-212933.

Coating of the magnetic composition may be effected directly on the nonmagnetic support, but may also be effected thereon via an interlayer such as an adhesive layer. The interlayer as referred to herein means a layer of only an adhesive agent or a composite layer composed of a dispersion of nonmagnetic fine grains such as carbon grains as dispersed in a binder.

Where a carbon-containing interlayer is provided between the magnetic layer and the nonmagnetic support, the binder to be used in the interlayer may be selected from various binders which may be also used in the magnetic layer. The carbon grains to be in the interlayer preferably have a grain size of from 10 to 50 nm, and the ratio of binder/carbon is preferably from 100/10 to 100/150 by weight. Regarding the thickness of the interlayer, it is preferably selected from 0.1 to 2 μm when the interlayer is a mere adhesive layer; and it is preferably from 0.5 to 4 μm when the interlayer is a nonmagnetic grains-containing type composite layer.

The interlayer may contain a lubricant which may be the same as or different from that to be used in the magnetic layer The details of the manner of dispersing the ferromagnetic powder and the binder and the manner of coating the magnetic composition on a support are described, for example, in JP-A-54-46011 and JP-A-5421805.

The total dry thickness of the magnetic layer thus coated is generally from about 0.5 to about 10 μm, preferably from about 0.7 to about 6.0 μm.

The magnetic layer as coated on a nonmagnetic support is generally subjected to orientation treatment so as to orient the ferromagnetic powder in the magnetic layer, when the magnetic recording medium is used in the form of a tape. More precisely, in this instance, the magnetic layer is oriented by magnetic field orientation treatment and then dried.

After the treatment, if desired, the layer is surface-treated so as to smooth the surface of the layer, and it may be hardened under heat and/or hardened by irradiation treatment thereto. Thereafter, the thus prepared magnetic recording medium web is slit into the desired shapes.

The back surface of the nonmagnetic support of the medium, which is not coated with the magnetic layer, is coated with a conventional backing layer.

In accordance with the present invention, a magnetic recording medium of high quality is obtained, which is not displaced out of alignment or which does not soil the head in VTR when it is run in a VTR by FF/REW mode. The medium may well be wound-up in a tape cassette to give a well trued-up or aligned form.

Next, the present invention will be explained in more detail by way of the following examples and comparative examples, which, however, are not intended to restrict the scope of the present invention. Unless otherwise specifically defined, all "parts" are by weight.

EXAMPLE

A magnetic layer-coating composition was prepared as mentioned below.

Magnetic Layer-Coating Composition

The following magnetic composition (I) was put in a kneader and thoroughly kneaded, and the following composition (II) was then added thereto and the mixture was further kneaded. Last, the following composition (III) was added to the resulting blend and thoroughly dispersed to prepare a magnetic layer-coating composition.

Components of Constituting Magnetic Layer

| | |
|---|---|
| (I) Co-containing gamma-$Fe_2O_3$ powder (Hc: 750 Oe; $S_{BET}$: 50 m$^2$/g) | 100 parts |
| Carbon Black (Asahi #70, manufactured by Asahi Carbon Co., Ltd.) | 6 parts |
| Vinyl Chloride-Vinyl Acetate Resin (MR110, manufactured by Japanese Geon Co.) | 12 parts |
| Polyurethane Resin (UR8600, manufactured by Toyo Spinning Co., Ltd.) | 6 parts |
| Oleic Acid | 0.5 part |
| Methyl Ethyl Ketone | 48 parts |
| (II) Abrasive Agent (AKP20, manufactured by Sumitomo Chemical Co.) | 10 parts |
| Polyurethane Resin (C7209, manufactured by Dai-Nippon Ink & Chemicals, Inc.) | 2 parts |
| Methyl Ethyl Ketone | 20 parts |
| (III) Polyisocyanate (C3040, manufactured by Nippon Polyurethane Industry Co., Ltd.) | 8 parts |
| Myristic Acid | 1 part |
| Fatty Acid Ester | 20 part |
| Methyl Ethyl Ketone | 20 parts |

Preparation of Magnetic Recording Medium Web

The magnetic layer-coating composition thus prepared was adjusted to have a suitable viscosity and then coated on a nonmagnetic support of polyethylene terephthalate having a thickness of 9.0 μm, the dry thickness of the coated magnetic layer being 5 μm. Then, the coated layer was dried together with orienting the layer in the coating direction in a magnetic field as generated by a pair of facing magnets of 3,000 gausses. Afterwards, the magnetic layer thus formed and oriented was successively calendering-treated. Next, the following backing layer was formed on the back surface of the nonmagnetic support. Thus, a magnetic recording medium web was prepared.

Composition of Backing Layer

| | |
|---|---|
| (I) Carbon Black (VULCAN XC72, manufactured by Cabot Co., Ltd.) | 100 parts |
| Nitrocellulose (manufactured by Daisel Ltd.) | 5 parts |
| Polyurethane Polycarbonate (FJ2, manufactured by Dainichi Seika Co.) | 45 parts |
| Phenoxy Resin (PKHH, manufactured by Union Carbide Co.) | 15 parts |
| Methyl Ethyl Ketone | 300 parts |
| (II) Polyisocyanate (C3040, manufactured by Nippon Polyurethane Industry Co., Ltd.) | 20 parts |
| Abrasive Agent (Hit 100, manufactured by Sumitomo Chemical Co.) | 0.3 part |
| Lubricant (KF69, manufactured by Shin-Etsu Chemical Co.) | 0.1 part |
| Copper Oleate | 0.1 part |
| Methyl Ethyl Ketone | 700 parts |

EXAMPLE 1

The magnetic tape web, as prepared above, was slit with a slitter means into a slit strip having a width of 0.5 inch at a slitting speed of 100 m/min, whereupon the slit strip was wound-up 250 m in a VHS reel.

EXAMPLES 2 AND 3

The same procedure as in Example 1 was repeated except that the slitting speed was changed to 50 m/min in Example 2 and to 40 m/min in Example 3.

EXAMPLES 4 TO 7

The same procedure as in Example 2 was repeated except that the surface roughness (Ra) of the surface of the magnetic layer was varied as indicated in Table 1 below by varying the condition in the calendering treatment as shown below.

| | Calendering Speed (m/min) | Calendering Pressure (kg/cm) | Calendering Temperature (°C.) | Ra (nm) |
|---|---|---|---|---|
| Example 4 | 150 | 300 | 90 | 6.5 |
| Example 5 | 200 | 250 | 90 | 10 |
| Example 6 | 200 | 250 | 70 | 12 |
| Example 7 | 200 | 200 | 60 | 15 |

EXAMPLES 8 TO 11

The same procedure as in Example 2 was repeated except that Young's modulus of each magnetic tape was varied by using various nonmagnetic supports each having a different Young's modulus as shown in Table 1 below were used.

EXAMPLE 12

The same procedure as in Example 2 was repeated except that the dried thickness of the magnetic layer was changed to 2 μm and a polyethylene terephthalate having a thickness of 7.5 μm was used as the nonmagnetic support.

EXAMPLE 13

The same procedure as in Example 2 was repeated except that a polyethylene terephthalate having a thickness of 14.5 μm was used as the nonmagnetic support.

COMPARATIVE EXAMPLE 1

The magnetic tape web, as prepared above, was slit into a slit strip having a width of 0.5 inch by the use of a laser beam, and the slit strip was wound-up 250 m in a VHS reel.

COMPARATIVE EXAMPLE 2

The magnetic tape web prepared as above was slit with a slitter into a slit having a width of 0.5 inch at a slitting speed of 300 m/min, whereupon the slit was wound-up 250 m in a VHS reel.

COMPARATIVE EXAMPLE 3

The magnetic tape web prepared as above was slit with a slitter into a slit strip having a width of 0.5 inch at a slitting speed of 30 m/min, whereupon the slit was wound-up 250 m in a VHS reel.

COMPARATIVE EXAMPLE 4

A magnetic tape web was prepared in the same manner as above, except that the calendering condition was varied so that the surface roughness (Ra) of the surface of the magnetic layer was 5.0 nm. The web was then slit in the same way as in Example 2 and wound-up 250 m in a VHS reel.

COMPARATIVE EXAMPLE 5

The same procedure as in Example 2 was repeated except that a nonmagnetic support having a different Young's modulus as shown in Table 1 below was used.

The thus prepared magnetic tapes were evaluated on the basis of the following described characteristics, and the results obtained are shown in Table 1 below.

Evaluation of Magnetic Tapes (I) Evaluation of Rolled-up Form of Tape:

The magnetic tape sample to be tested was actually run in Sony's VTR designated BVW-75, whereupon the condition of the rolled-up form of the tape after one complete pass for FF/REW mode was checked and evaluated on the basis of 10-point evaluation.

E: The number of protruded tapes was from 0 to 3.
G: The number of protruded tapes was from 4 to 7.
B: The number of protruded tapes was 8 or more.

(II) Evaluation of Head-Soiling Resistance:

After evaluation of the rolled-up form of the tape in the above (I), the head was observed with an optical microscope and the head-soiling resistance of the tape tested was evaluated as mentioned below.
E: Head was not soiled.
G: Head was somewhat soiled.
M: Head was fairly soiled.
B: Head was noticeably soiled.

(III) Total Evaluation

The total evaluation was carried out with the following four grades.
E: Excellent
G: Good
M: Fair
B: Poor (unusable)

TABLE 1

| Example No. | Area of Depression ($\mu m^2$) | Surface Roughness (Ra) of Magnetic Layer (nm) | Young's Modulus of Magnetic Tape ($kg/mm^2$) | Slitting Speed (m/min) | Thickness ($\mu m$) | Rolled-up Form of Tape | Soiling of Head | Total Evaluation | Remarks |
|---|---|---|---|---|---|---|---|---|---|
| Comparative Example 1 | 15 | 10 | 500 | — | 15 | B | E | B | Cutting by use of a laser beam |
| Comparative Example 2 | 13 | " | " | 300 | " | B | E | B | |
| Example 1 | 20 | " | " | 100 | " | E | E | E | |
| Example 2 | 30 | " | " | 50 | " | E | G | E | |
| Example 3 | 40 | " | " | 40 | " | E | G | E | |
| Comparative Example 3 | 80 | " | " | 30 | " | E | B | B | |
| Comparative Example 4 | 30 | 5.0 | " | 50 | " | B | G | B | |
| Example 4 | " | 6.5 | " | " | " | G | G | G | |
| Example 5 | " | 10 | " | " | " | E | G | E | |
| Example 6 | " | 12 | " | " | " | E | G | E | |
| Example 7 | " | 15 | " | " | " | E | G | E | |
| Example 8 | " | 10 | 450 | " | " | E | G | E | |
| Example 9 | " | " | 490 | " | " | E | G | E | |
| Example 10 | 30 | 10 | 510 | 50 | 15 | E | G | E | |
| Example 11 | " | " | 550 | " | " | G | E | G | |
| Comparative Example 5 | 10 | " | 600 | " | " | B | E | B | |
| Example 12 | 15 | " | 500 | " | 10 | G | E | G | |
| Example 13 | 60 | " | 500 | " | 20 | E | M | M | |

Note:
Laser beam was used for slitting.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having thereon a magnetic layer on one surface of the nonmagnetic support and a backing layer on the other surface thereof, and having a thickness of from 10 to 40 μm, wherein the surface of an edge of the medium which is to be in contact with the inner surface of a flange of a reel of a magnetic tape cassette, and the flange being a base for aligning the edge of the medium when the medium is wound around the reel, is provided with a depression having a cross sectional area of from 15 to 60 m², wherein said area is defined by four lines comprising: 1) an extension line from the surface of the magnetic layer at the edge, 2) an extension line from the surface of the backing layer at the edge, 3) a line which is in tangential contact with the outermost face of the cross section of the edge and which crosses both said extension lines perpendicularly thereto and 4) a peripheral line of the face of the edge, and that the surface roughness (Ra) of the surface of the magnetic layer is 6.5 nm or more with a cut-off value of 0.25 mm and that the medium, as a whole, has a Young's modulus ($M_{0.5}$) of 550 kg/mm² or less.

2. The magnetic recording medium as in claim 1, wherein the area of the depression is from 20 to 40 $\mu m^2$ and a ratio value as obtained by dividing the area for the depression by a total medium thickness is from 1.3 to 3.

3. The magnetic recording medium as in claim 1, wherein said magnetic layer has a dry thickness of from about 0.5 to about 10 $\mu m$.

4. The magnetic recording medium as in claim 1, wherein said magnetic recording medium is a magnetic tape and has a thickness of from 10 to 40 $\mu m$.

5. The magnetic recording medium as in claim 1, wherein said depression having a cross sectional area of from 15 to 60 $\mu m^2$ is formed under the condition of a slitting speed of about 50 m/min, a gearing depth between the upper cutting blade and the lower cutting blade is from 0.4 to 0.5 mm, and a ratio of the speed of the upper cutting blade to the speed of the lower cutting blade is about 1.05.

* * * * *

UNITED STATES PATENT AND TRADEMARK OFFICE
CERTIFICATE OF CORRECTION

PATENT NO. : 5,164,243

DATED : November 17, 1992

INVENTOR(S) : Kanazawa, et al

It is certified that error appears in the above-indentified patent and that said Letters Patent is hereby corrected as shown below:

Column 14, line 64, delete "$m^2$" and insert --$um^2$--.

Signed and Sealed this

Eighteenth Day of January, 1994

BRUCE LEHMAN

Attest:

Attesting Officer

Commissioner of Patents and Trademarks

UNITED STATES PATENT AND TRADEMARK OFFICE
CERTIFICATE OF CORRECTION

PATENT NO. : 5,164,243
DATED : November 17, 1992
INVENTOR(S) : KANAZAWA, et al.

It is certified that error appears in the above-indentified patent and that said Letters Patent is hereby corrected as shown below:

In Claim 1, at column 14, line 64, delete "$m^2$" and insert -- $\mu m^2$ --.

This certificate supersedes Certificate of Correction issued January 18, 1994.

Signed and Sealed this

Tenth Day of May, 1994

Attest:

BRUCE LEHMAN

Attesting Officer

Commissioner of Patents and Trademarks